(12) United States Patent
Amor et al.

(10) Patent No.: US 9,016,985 B2
(45) Date of Patent: Apr. 28, 2015

(54) CLAMPING SYSTEM

(75) Inventors: Raouf Ben Amor, Lorch (DE);
Marianne Krause, Deizisau (DE);
Andreas Herb, Lorch (DE); Heiko Libhafsky, Ohmden (DE); Stephan Keintzel, Wendlingen (DE)

(73) Assignee: CeramTec GmbH, Plochingen (DE)

( * ) Notice: Subject to any disclaimer, the term of this patent is extended or adjusted under 35 U.S.C. 154(b) by 40 days.

(21) Appl. No.: 13/515,587

(22) PCT Filed: Dec. 22, 2010

(86) PCT No.: PCT/EP2010/070467
§ 371 (c)(1),
(2), (4) Date: Jun. 26, 2012

(87) PCT Pub. No.: WO2011/076835
PCT Pub. Date: Jun. 30, 2011

(65) Prior Publication Data
US 2013/0051941 A1    Feb. 28, 2013

(30) Foreign Application Priority Data

Dec. 22, 2009 (DE) .................. 10 2009 060 436

(51) Int. Cl.
*B23B 27/16*    (2006.01)

(52) U.S. Cl.
CPC .......... *B23B 27/164* (2013.01); *Y10T 407/228* (2015.01); *Y10T 407/20* (2015.01); *B23B 2200/088* (2013.01); *B23B 2200/125* (2013.01);
(Continued)

(58) Field of Classification Search
CPC ............ B23B 27/164; Y10T 407/2284; Y10T 407/2288; Y10T 407/23

USPC .................................................. 407/107, 108
See application file for complete search history.

(56) References Cited

U.S. PATENT DOCUMENTS 3,490,117 A    1/1970 Hertel
4,480,950 A *  11/1984 Kraft et al. .................... 407/103
(Continued)

FOREIGN PATENT DOCUMENTS

EP          0 698 437 A1    2/1996
WO      WO 98/29211 A1    7/1998
(Continued)

*Primary Examiner* — Will Fridie, Jr.
(74) *Attorney, Agent, or Firm* — Norton Rose Fulbright US LLP

(57) ABSTRACT

The invention relates to an indexable insert (1) for fitting in supporting tools (5) for the machining of workpieces, with an upper side (2) and an underside (3), on which clamping recesses are arranged, and with a circumferential geometry (4) joining the upper side (2) and the underside (3), wherein cutting corners and cutting edges (6) are arranged at the transition from the upper side (2) and the underside (3) to the circumferential geometry (4). In order that the clamping situation during machining is improved significantly, and at the same time the introduction of the clamping recesses is made easier, it is proposed that the clamping recess consists of grooves (10) which are arranged on two crossing straight lines (11), wherein the two straight lines (11) run at right angles in relation to each other and all the grooves (10) are arranged at the same distance from the center axis or longitudinal axis (12) of the indexable insert (1), and the crossing point (13) of the two straight lines (11) lies on the center axis or longitudinal axis (12) of the indexable insert (1).

12 Claims, 2 Drawing Sheets

(52) U.S. Cl.
CPC ..... *B23B 2200/128* (2013.01); *B23B 2200/286* (2013.01); *B23B 2226/18* (2013.01)

(56) References Cited

U.S. PATENT DOCUMENTS

| | | | |
|---|---|---|---|
| 5,658,100 A | 8/1997 | Deiss et al. | |
| 5,803,675 A * | 9/1998 | Von Haas | 407/107 |
| 6,379,087 B1 * | 4/2002 | Alexander, IV | 407/107 |
| 7,261,496 B2 * | 8/2007 | Zitzlaff | 407/107 |
| 7,320,563 B2 * | 1/2008 | Muller et al. | 407/113 |
| 7,530,769 B2 * | 5/2009 | Kress et al. | 408/1 R |
| 8,033,764 B2 * | 10/2011 | Noggle | 407/113 |
| 8,556,548 B2 * | 10/2013 | Park et al. | 407/107 |
| 2003/0086766 A1 | 5/2003 | Andras | |
| 2010/0266354 A1 | 10/2010 | Zitzlaff et al. | |

FOREIGN PATENT DOCUMENTS

| | | |
|---|---|---|
| WO | WO 01/58626 A1 | 8/2001 |
| WO | WO 2004/024379 A1 | 3/2004 |
| WO | WO 2007/127109 A2 | 11/2007 |
| WO | WO 2008/155331 A1 | 12/2008 |

* cited by examiner

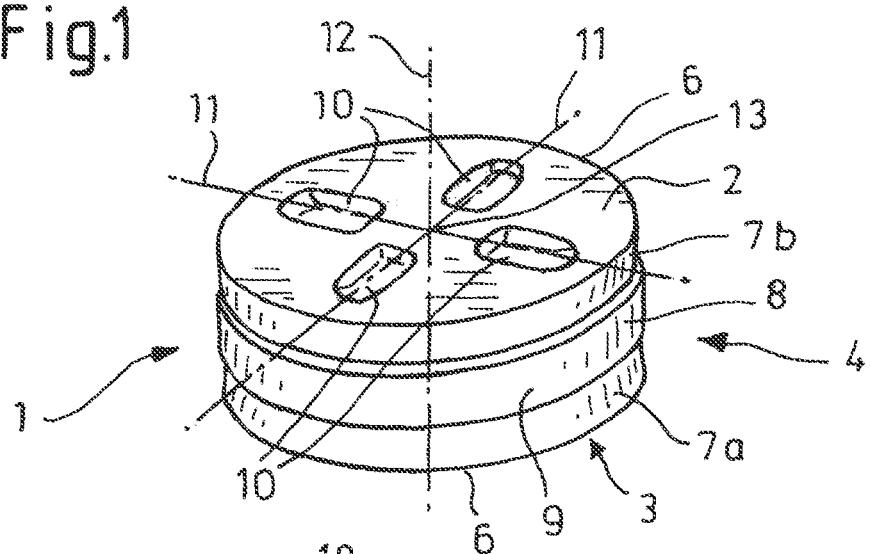
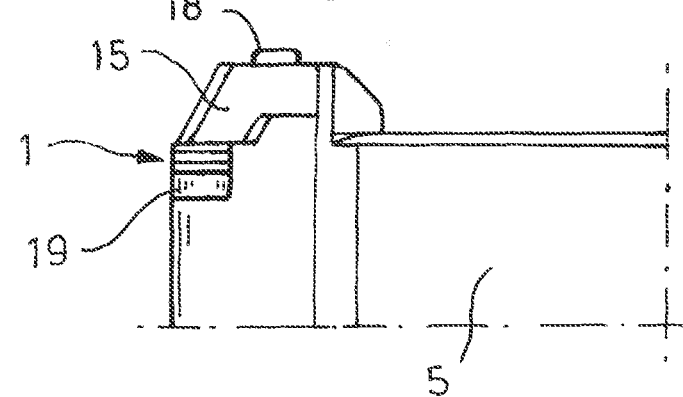
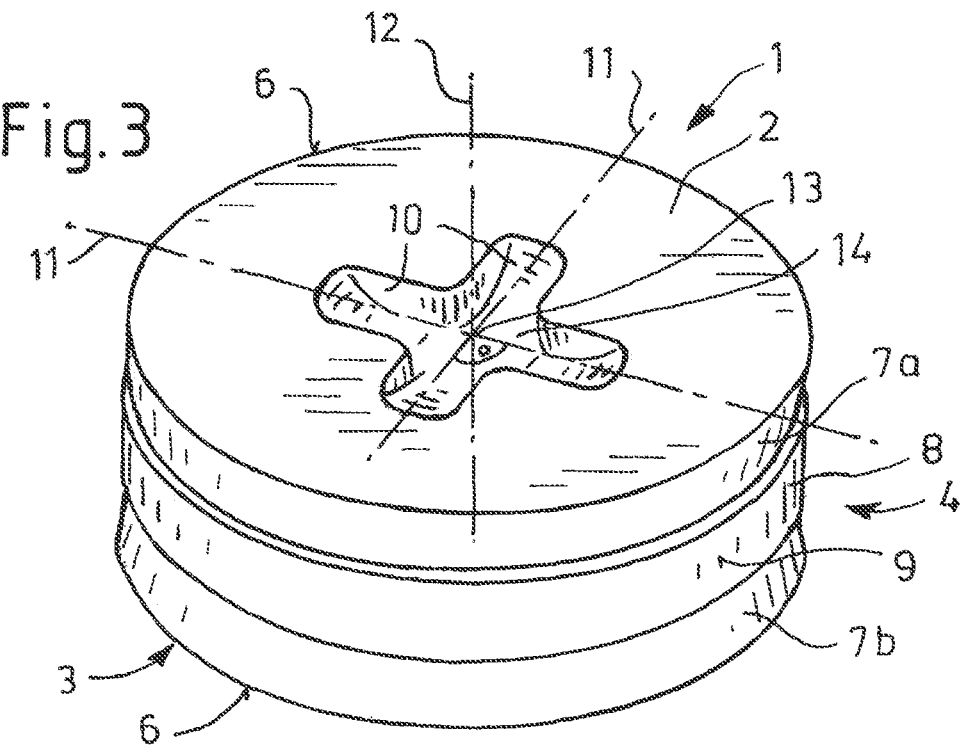

CLAMPING SYSTEM

This application is a §371 of PCT/EP2010/070467 filed Dec. 22, 2010 and claims priority from DE 10 2009 060 436.7 filed Dec. 22, 2009.

BACKGROUND OF THE INVENTION

The invention relates to an indexable insert for mounting in carrier tools for machining workpieces, having a top side and a bottom side on which clamping depressions are situated, and a circumferential geometry which joins the top side and the bottom side, wherein cutting corners and/or cutting edges are situated at the transition from the top side and the bottom side to the circumferential geometry.

This type of indexable insert is known from WO 2008/155331 A1.

OBJECTS OF THE INVENTION

The object of the present invention is to improve an indexable insert in such a way that the clamping situation during machining is significantly improved, and at the same time the introduction of the clamping depressions is simplified.

SUMMARY OF THE INVENTION

According to the invention, this object is achieved in that the clamping depression is composed of grooves which are situated on two intersecting straight lines, the two straight lines extending at right angles to one another, and all grooves being situated at the same distance from the center axis or longitudinal axis of the indexable insert, and the point of intersection of the two straight lines lying on the center axis or longitudinal axis of the indexable insert. The indexable insert is thus uniformly clamped in the mounted state; i.e., the clamping forces uniformly press the indexable insert onto a carrier tool. The indexable insert is not subjected to load on one side, thus significantly improving the clamping situation. In addition, grooves allow greater ease of introduction than the customary clamping depressions.

BRIEF DESCRIPTION OF THE FIGURES

FIG. 1 shows a cylindrical indexable insert according to the invention.
FIG. 2 shows a clamping claim according to the invention.
FIG. 3 shows a cylindrical indexable insert according to the invention having two grooves.

DETAILED DESCRIPTION

Figure 4:
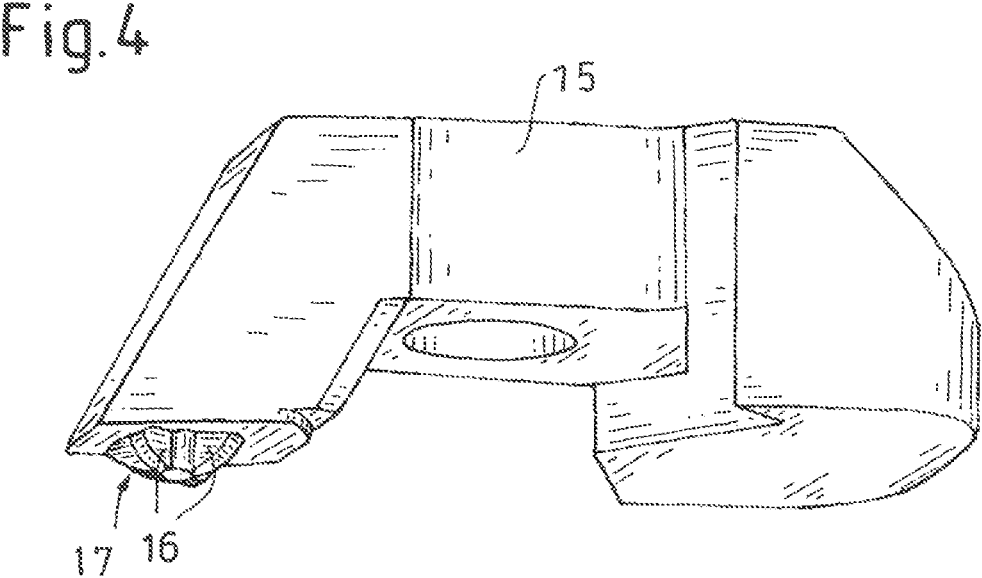
FIG. 4. Shows a clamping claw according to the invention.

In one embodiment of the invention, four grooves are situated on each top side and bottom side, two grooves being situated on each of the straight lines.

This embodiment results in excellent distribution of the clamping forces on the indexable insert since the grooves are uniformly distributed, and therefore the indexable insert is uniformly clamped in the mounted state. As a result of the mentioned four grooves, for a cylindrical indexable insert the top and bottom sides are divided into four circle segments having a segment angle of 90 degrees. Each circle segment has a groove, so that in the mounted state each circle segment is also clamped. This embodiment is described in greater detail below with reference to FIG. 1. However, the indexable insert may also have a cuboidal design, with a square top side and bottom side.

In an alternative embodiment of the invention, two grooves are situated on each top side and bottom side, a single groove being situated on each straight line, and the two grooves intersecting on each top side and bottom side and forming a cross groove whose midpoint lies on the center axis or longitudinal axis of the indexable insert. This embodiment, shown in FIG. 3, has the advantage that only two grooves must be introduced, and the resulting clamping force lies exactly on the center axis or longitudinal axis of the indexable insert, thus improving the clamping situation.

In a preferred refinement of the invention, the circumferential geometry has circumferential positive open spaces on both sides beneath the cutting corners and/or cutting edges which are recessed with respect to the cutting corners and/or cutting edges, thus providing a positive clearance angle on both sides, and a collar which is raised relative to the lowest points of the open spaces is situated between two open spaces which are oppositely situated, in relation to the top side and bottom side, on the circumferential geometry, the surface of the collar being used as a bearing surface in carrier tools.

Mounting in conventional clamping holders is thus made possible without sacrificing the features and advantages of a positive open space. When, for a cylindrical indexable insert, the collar has a peripheral design on the circumferential geometry, the bearing surface is maximized, and mounting may be carried out in any possible orientation.

A clamping claw for clamping an indexable insert according to the invention in a carrier tool for machining is characterized in that the clamping claw has cams at its end facing the indexable insert which are directly or indirectly adapted to the grooves in the indexable insert. In the present context, "directly" means that the cams have a one-piece design with the clamping claw. "Indirectly" means that a pressure plate or the like is fastened to the clamping claw, and the cams are situated on this pressure plate instead of being situated directly on the clamping claw.

In one embodiment the cams form a cross cam.

The invention therefore relates to an indexable insert for mounting in carrier tools for machining workpieces, having a top side and a bottom side, and a circumferential geometry which joins the top side and the bottom side, in one preferred embodiment cutting corners and/or cutting edges being situated at the transition from the top side and the bottom side to the circumferential geometry, and the circumferential geometry having circumferential positive open spaces on both sides beneath the cutting corners and/or cutting edges which are recessed with respect to the cutting corners and/or cutting edges, thus providing a positive clearance angle on both sides.

According to the prior art, ceramic cutting inserts are generally manufactured with a clearance angle $\alpha$ of 0° or with a clearance angle $\alpha > 0°$.

If the clearance angle $\alpha = 0°$, the cutting insert may be used on both sides, and cutting corners and cutting edges on the top side and the bottom side are available. For a rectangular cutting insert, for example four cutting edges and/or cutting corners are situated in each case on the top side and bottom side; i.e., a total of eight cutting edges and/or cutting corners are available.

If the clearance angle $\alpha > 0°$, the cutting insert may be used on only one side, thus reducing the number of usable cutting corners and/or cutting edges by half compared to the design in which the clearance angle $\alpha = 0°$.

An indexable insert is known from U.S. Pat. No. 3,490,117, which has circumferential positive open spaces on the circumferential geometry on both sides beneath the cutting corners and cutting edges which are recessed with respect to the cutting corners and cutting edges, thus providing a positive clearance angle on both sides. A disadvantage herein is that this indexable insert for clamping onto carrier tools requires a plate seat which is adapted to the circumferential geometry of the cutting insert, so that it is not mountable in conventional clamping holders. The exchangeability and use are thus limited and made more difficult.

One preferred embodiment according to the invention is characterized in that a collar which is raised relative to the lowest points of the open spaces is situated between two open spaces which are oppositely situated, in relation to the top side and bottom side, on the circumferential geometry, the surface of the collar being used as a bearing surface in carrier tools. Mounting in conventional clamping holders is thus made possible without sacrificing the features and advantages of a positive open space.

In one embodiment, the collar has a peripheral design on the circumferential geometry, thus maximizing the bearing surface and allowing mounting to be carried out in any possible orientation.

In one preferred design, the indexable insert is made of a ceramic. An extremely long service life for the cutting insert results in particular with ceramics.

In one design according to the invention, the length of the open spaces is less than one-half the thickness of the indexable insert. As a result, the collar may be centrally located on the circumferential geometry and also have a sufficient width.

To reinforce the cutting edges and/or cutting corners, in one embodiment the open spaces are provided at essentially right angles to the top side and bottom side of the indexable insert in the contact area directly adjoining the cutting edges and/or cutting corners. The cutting insert may thus lie against bearing surfaces in the carrier tool via the two contact areas as well as via the raised collar. At the same time, this contact area reinforces the cutting corners and/or cutting edges.

In one embodiment of the invention, the surface of the collar is at the same or greater radial height than the cutting edges and/or cutting corners in relation to the longitudinal axis of the indexable insert. The cutting insert may thus lie against bearing surfaces in the carrier tool in any desired manner.

In one embodiment of the invention, the contact area of the open spaces and the surface of the collar are at the same radial height in relation to the longitudinal axis of the indexable insert, or the radial height of the surface of the collar is greater than the radial height of the contact area of the open spaces in relation to the longitudinal axis of the indexable insert.

In one embodiment the open spaces are introduced by peripheral grinding. In another embodiment, the open spaces are introduced by appropriate pressing of the green body and subsequent sintering.

In one embodiment the cutting insert has a cylindrical design, the top side and bottom side forming the end faces, and the side surfaces forming the peripheral surface of the cylinder. In another advantageous embodiment the cutting insert has a cuboidal design.

The clamping claw, also referred to as a clamping finger, has a cross cam at its end facing the culling insert which is adapted to the cross groove. The cross cam may also be situated on a pressure plate which is fastened to the clamping finger. For clamping, the cross cam engages in the cross groove in a clamping manner.

A carrier tool for machining has a cutting insert according to the invention which is held in a holder by a clamping finger according to the invention.

The cutting insert is preferably made of a ceramic, preferably cubic boron nitride (CBN).

In contrast to existing systems, this indexable insert is pulled against the seat via a positive-fit cross groove and corresponding bevels in the holder by means of a clamping finger. The clamping finger has the shape of the negative of the cross groove.

The invention is explained in greater detail below with reference to five figures.

FIG. 1 shows a cylindrical indexable insert 1 according to the invention, in each case having a circular top side 2 and a circular bottom side 3, and a circumferential geometry 4 which joins these sides. The respective edges of the sides 2, 3 with respect to the circumferential geometry 4 are designed as cutting edges 6.

In this embodiment, four grooves 10 are introduced on each side 2, 3. The grooves 10 are located on two imaginary straight lines 11 which extend on the surface of the sides 2, 3 and which are situated at right angles to one another. All grooves 10 are situated at the same distance, namely, the distance 0, from the center axis or longitudinal axis 12 of the indexable insert 1, and the point of intersection 13 of the two straight lines 11 lies on the center axis or longitudinal axis 12 of the indexable insert 1. Due to this configuration of the grooves 10, the indexable insert is subjected to uniform load in the mounted state, thus optimizing the clamping situation.

The circumferential geometry 4 has circumferential positive open spaces 7a, 7b on both sides beneath the cutting edges 6 which are recessed with respect to the cutting corners and cutting edges 6, thus providing a positive clearance angle on both sides. A collar 8 which is raised relative to the lowest points of the open spaces 7a, 7b is situated between two open spaces 7a, 7b which are oppositely situated, in relation to the top side 2 and bottom side 3, on the circumferential geometry 4, the surface 9 of the collar being used as a bearing surface in carrier tools 5 (see FIG. 2).

All indexable inserts described herein are made of a ceramic. Due to its hardness, cubic boron nitride (CBN) is preferred.

FIG. 2 shows a clamping claw 15 according to the invention which is fastened to a carrier tool 5 via a screw 18, and which presses an indexable insert 1 according to the invention into its plate seat on a support plate 19. On its side facing the indexable insert 1, the clamping claw 15 has cams which are adapted to the grooves 10 in the indexable insert 1. The cams are described in greater detail below with reference to another embodiment.

FIG. 3 shows a cylindrical indexable insert 1 according to the invention, in each case having a circular top side 2 and a circular bottom side 3, and a circumferential geometry 4 which joins these sides 2, 3. The respective edges of the sides 2, 3 with respect to the circumferential geometry 4 are designed as cutting edges 6.

In this embodiment, two grooves 10 are introduced on each side 2, 3. The grooves 10 are located on two imaginary straight lines 11 which extend on the surface of the sides 2, 3 and which are situated at right angles to one another. All grooves 10 are situated at the same distance, namely, the distance 0, from the center axis or longitudinal axis 12 of the indexable insert 1, and the point of intersection 13 of the two straight lines 11 lies on the center axis or longitudinal axis 12 of the indexable insert 1.

According to the invention, in this embodiment a single groove 10 is situated on each straight line 11, the two grooves 10 intersecting and forming a cross groove 14 whose midpoint lies on the center axis or longitudinal axis 12 of the indexable insert 1. The circumferential geometry 4 has a design as described for FIG. 1.

Figure 5:
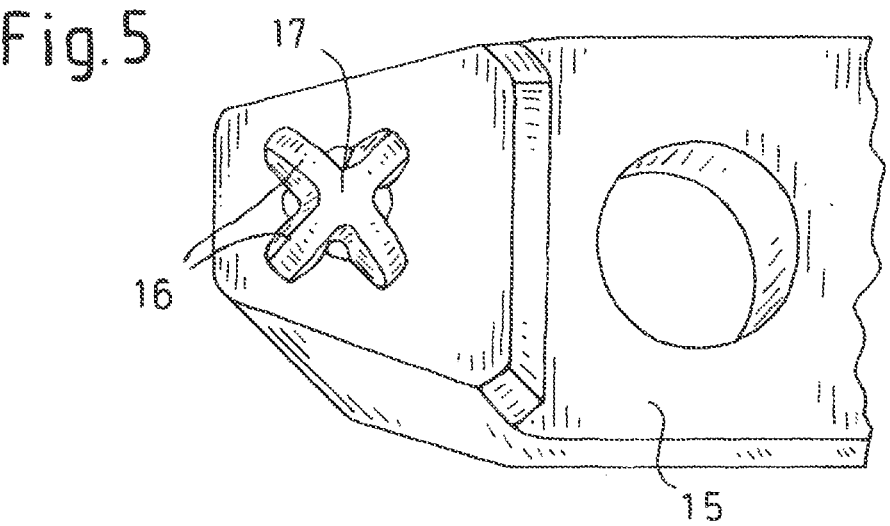
FIG. 5 shows a clamping claw according to the invention.

FIGS. 4 and 5 show a clamping claw 15 according to the invention which, as shown in FIG. 2, fastens the indexable insert 1 to the carrier tool. For clamping the indexable insert 1 on the carrier tool, the clamping claw has cams 16 at its end facing the indexable insert which are directly or indirectly adapted to the grooves in the indexable insert. In the embodiment according to FIG. 3, one cross cam 17 composed of two intersecting cams 16 is required.

The invention claimed is:

1. An indexable insert for mounting in carrier tools for machining workpieces, comprising:
    a top side;
    a bottom side on which clamping depressions are situated; and
    a circumferential geometry which joins the top side and the bottom side;
    wherein cutting corners and cutting edges are situated at the transition from the top side and the bottom side to the circumferential geometry;
    wherein the clamping depression is composed of grooves which are situated on two intersecting straight lines, the two intersecting straight lines extending at right angles to one another; and
    wherein all grooves being situated at the same distance from the center axis or longitudinal axis of the indexable insert, and the point of intersection of the two straight lines lying on the center axis or longitudinal axis of the indexable insert, wherein the circumferential geometry has circumferential positive open spaces on both sides beneath the cutting corners and cutting edges which are recessed with respect to the cutting corners and cutting edges, thus providing a positive clearance angle on both sides;
    wherein a collar which is raised relative to the lowest points of the open spaces is situated between two open spaces which are oppositely situated, in relation to the top side and bottom side, on the circumferential geometry, and
    wherein the surface of the collar is a bearing surface in a carrier tool.

2. An indexable insert for mounting in carrier tools for machining workpieces, comprising:
    a top side;
    a bottom side on which clamping depressions are situated; and
    a circumferential geometry which joins the top side and the bottom side;
    wherein cutting corners and cutting edges are situated at the transition from the top side and the bottom side to the circumferential geometry;
    wherein the clamping depression is composed of grooves which are situated on two intersecting straight lines, the two intersecting straight lines extending at right angles to one another; and
    wherein all grooves being situated at the same distance from the center axis or longitudinal axis of the indexable insert, and the point of intersection of the two straight lines lying on the center axis or longitudinal axis of the indexable insert, wherein the circumferential geometry has circumferential positive open spaces on both sides beneath the cutting corners and cutting edges which are recessed with respect to the cutting corners and cutting edges, thus providing a positive clearance angle on both sides;
    wherein a collar which is raised relative to the lowest points of the open spaces is situated between two open spaces which are oppositely situated, in relation to the top side and bottom side, on the circumferential geometry,
    wherein four grooves are situated on each top side and bottom side, and wherein two grooves are situated on each of the intersecting straight lines; and
    wherein the surface of the collar is a bearing surface in a carrier tool.

3. An indexable insert for mounting in carrier tools for machining workpieces, comprising:
    a top side;
    a bottom side on which clamping depressions are situated; and
    a circumferential geometry which joins the top side and the bottom side;
    wherein cutting corners and cutting edges are situated at the transition from the top side and the bottom side to the circumferential geometry;
    wherein the clamping depression is composed of grooves which are situated on two intersecting straight lines, the two intersecting straight lines extending at right angles to one another; and
    wherein all grooves being situated at the same distance from the center axis or longitudinal axis of the indexable insert, and the point of intersection of the two straight lines lying on the center axis or longitudinal axis of the indexable insert, wherein the circumferential geometry has circumferential positive open spaces on both sides beneath the cutting corners and cutting edges which are recessed with respect to the cutting corners and cutting edges, thus providing a positive clearance angle on both sides; and
    wherein a collar which is raised relative to the lowest points of the open spaces is situated between two open spaces which are oppositely situated, in relation to the top side and bottom side, on the circumferential geometry,
    wherein two grooves are situated on each top side and bottom side, a single groove being situated on each straight line, and the two grooves intersecting on each top side and bottom side and forming a cross groove whose midpoint lies on the center axis or longitudinal axis of the indexable insert; and
    wherein the surface of the collar is a bearing surface in a carrier tool.

4. A clamping claw for clamping an indexable insert according to claim 1 in a carrier tool for machining, said clamping claw comprising cams at its end facing the indexable insert which are directly or indirectly adapted to the grooves in the indexable insert.

5. A clamping claw for clamping an indexable insert according to claim 2 in a carrier tool for machining, said clamping claw comprising cams at its end facing the indexable insert which are directly or indirectly adapted to the grooves in the indexable insert.

6. A clamping claw for clamping an indexable insert according to claim 3 in a carrier tool for machining, said clamping claw comprising cams at its end facing the indexable insert which are directly or indirectly adapted to the grooves in the indexable insert.

7. A clamping claw for clamping an indexable insert for mounting in carrier tools for machining workpieces, comprising:
    a top side;
    a bottom side on which clamping depressions are situated; and
    a circumferential geometry which joins the top side and the bottom side;

wherein cutting corners and cutting edges are situated at the transition from the top side and the bottom side to the circumferential geometry;

wherein the clamping depression is composed of grooves which are situated on two intersecting straight lines, the two intersecting straight lines extending at right angles to one another; and wherein all grooves being situated at the same distance from the center axis or longitudinal axis of the indexable insert, and the point of intersection of the two straight lines lying on the center axis or longitudinal axis of the indexable insert in a carrier tool for machining, said clamping claw comprising cams at its end facing the indexable insert which are directly or indirectly adapted to the grooves in the indexable insert, wherein the cams form a cross cam.

8. A clamping claw for clamping an indexable insert for mounting in carrier tools for machining workpieces, comprising:

a top side;

a bottom side on which clamping depressions are situated; and a circumferential geometry which joins the top side and the bottom side;

wherein cutting corners and cutting edges are situated at the transition from the top side and the bottom side to the circumferential geometry;

wherein the clamping depression is composed of grooves which are situated on two intersecting straight lines, the two intersecting straight lines extending at right angles to one another; and wherein all grooves being situated at the same distance from the center axis or longitudinal axis of the indexable insert, and the point of intersection of the two straight lines lying on the center axis or longitudinal axis of the indexable insert in a carrier tool for machining, said clamping claw comprising cams at its end facing the indexable insert which are directly or indirectly adapted to the grooves in the indexable insert, in a carrier tool for machining, said clamping claw comprising cams at its end facing the indexable insert which are directly or indirectly adapted to the grooves in the indexable insert, wherein four grooves are situated on each top side and bottom side, and wherein two grooves are situated on each of the intersecting straight lines, wherein the cams form a cross cam.

9. An indexable insert for mounting in carrier tools for machining workpieces, comprising:

a top side;

a bottom side on which clamping depressions are situated; and a circumferential geometry which joins the top side and the bottom side;

wherein cutting corners and cutting edges are situated at the transition from the top side and the bottom side to the circumferential geometry;

wherein the clamping depression is composed of grooves which are situated on two intersecting straight lines, the two intersecting straight lines extending at right angles to one another; and wherein all grooves being situated at the same distance from the center axis or longitudinal axis of the indexable insert, and the point of intersection of the two straight lines lying on the center axis or longitudinal axis of the indexable insert, wherein two grooves are situated on each top side and bottom side, a single groove being situated on each straight line, and the two grooves intersecting on each top side and bottom side and forming a cross groove whose midpoint lies on the center axis or longitudinal axis of the indexable insert, wherein the cams form a cross cam.

10. A clamping claw according to claim 4, wherein the cams form a cross cam.

11. A clamping claw according to claim 5, wherein the cams form a cross cam.

12. A clamping claw according to claim 6, wherein the cams form a cross cam.

* * * * *